United States Patent
Cushing et al.

(10) Patent No.: US 10,582,157 B1
(45) Date of Patent: Mar. 3, 2020

(54) LIVE INTERACTION IN PERSISTENT CONVERSATIONS

(71) Applicant: Google LLC, Mountain View, CA (US)

(72) Inventors: Kathryn Chapman Cushing, San Francisco, CA (US); Benjamin David Eidelson, Palo Alto, CA (US); Randall Sarafa, San Francisco, CA (US); Mayur Kamat, Bothell, WA (US); Param Reddappagari, Redmond, WA (US); Shrikrishna Vijaykumar Borde, Redmond, WA (US); Michael Dodd, Kirkland, WA (US); Richard Fulcher, Sunnyvale, CA (US); Gülay Birand, Seattle, WA (US); Ivan Bertona, Stockholm (SE)

(73) Assignee: Google LLC, Mountain View, CA (US)

( * ) Notice: Subject to any disclaimer, the term of this patent is extended or adjusted under 35 U.S.C. 154(b) by 853 days.

(21) Appl. No.: 15/010,819

(22) Filed: Jan. 29, 2016

Related U.S. Application Data

(63) Continuation of application No. 13/748,582, filed on Jan. 23, 2013, now Pat. No. 9,253,223.

(51) Int. Cl.
  *G06F 3/048* (2013.01)
  *H04N 7/15* (2006.01)
  *H04L 29/06* (2006.01)

(52) U.S. Cl.
  CPC ............. *H04N 7/15* (2013.01); *H04L 65/403* (2013.01)

(58) Field of Classification Search
  None
  See application file for complete search history.

(56) References Cited

U.S. PATENT DOCUMENTS 6,484,196 B1 * 11/2002 Maurille ............. H04L 12/1831
  370/260
7,124,167 B1 * 10/2006 Bellotti ................... H04L 51/04
  709/206

(Continued)

FOREIGN PATENT DOCUMENTS

WO      2014/013356      1/2014

OTHER PUBLICATIONS

"USPTO", Non-Final Office Action is U.S. Appl. No. 15/050,180, dated May 5, 2016, 4 pp.

(Continued)

*Primary Examiner* — Thanh T Vu
(74) *Attorney, Agent, or Firm* — Fish & Richardson P.C.

(57) ABSTRACT

Systems, methods and computer readable media for live interactions in persistent conversations are described. In some implementations, a method can include receiving a communication message sent from a first user to a second user, wherein the communication message includes initiation of a live interaction. The method can also include generating a live interaction user interface element for display as part of a persistent conversation interface. The method can further include storing a representation of the live interaction in a conversation content section of a persistent conversation object when the live interaction ends. The method can include updating conversation state information of the persistent conversation object to reflect the receiving of the communication message and the storing of the representation.

20 Claims, 10 Drawing Sheets

(56) References Cited

U.S. PATENT DOCUMENTS

| | | | |
|---|---|---|---|
| 7,293,049 | B2 | 11/2007 | Kadyk et al. |
| 7,441,199 | B2 | 10/2008 | Zenith |
| 7,512,400 | B2 | 3/2009 | Starbuck et al. |
| 7,603,467 | B2 | 10/2009 | Malik et al. |
| 7,743,022 | B2 | 6/2010 | Kaasten et al. |
| 7,769,144 | B2 | 8/2010 | Yao et al. |
| 8,001,102 | B2 | 8/2011 | Szeto et al. |
| 8,160,563 | B2 | 4/2012 | Chen et al. |
| 8,321,581 | B2 * | 11/2012 | Katis ................ H04L 51/04 379/93.08 |
| 8,355,698 | B2 | 1/2013 | Teng |
| 8,411,046 | B2 | 4/2013 | Kruzeniski |
| 8,412,845 | B2 * | 4/2013 | Katis ............. H04L 12/1827 370/468 |
| 8,605,718 | B2 | 12/2013 | Hemar et al. |
| 9,253,223 | B1 | 2/2016 | Cushing et al. |
| 9,270,630 | B1 | 2/2016 | Eidelson et al. |
| 9,338,403 | B2 | 5/2016 | Eidelson et al. |
| 9,705,842 | B2 | 7/2017 | Eidelson et al. |
| 2003/0023683 | A1 * | 1/2003 | Brown ............. H04L 12/1831 709/204 |
| 2004/0015548 | A1 | 1/2004 | Lee |
| 2004/0223599 | A1 | 11/2004 | Bear et al. |
| 2005/0080848 | A1 | 4/2005 | Shah |
| 2007/0006094 | A1 | 1/2007 | Canfield et al. |
| 2007/0033534 | A1 | 2/2007 | Kim et al. |
| 2008/0313297 | A1 | 12/2008 | Heron et al. |
| 2010/0199340 | A1 | 8/2010 | Jonas et al. |
| 2011/0148916 | A1 | 6/2011 | Blattner |
| 2011/0216071 | A1 | 9/2011 | Klassen et al. |
| 2011/0222515 | A1 | 9/2011 | Wang et al. |
| 2011/0296324 | A1 | 12/2011 | Goossens |
| 2011/0320536 | A1 | 12/2011 | Lobb et al. |
| 2012/0004956 | A1 | 1/2012 | Huston et al. |
| 2012/0016941 | A1 | 1/2012 | Douckine et al. |
| 2012/0278475 | A1 | 11/2012 | Papkipos et al. |
| 2013/0117392 | A1 | 5/2013 | Aceves |
| 2013/0325922 | A1 | 12/2013 | Chaudhri et al. |

OTHER PUBLICATIONS

USPTO. Non-Final Office Action cited in corresponding U.S. Appl. No. 13/748,526, dated Aug. 15, 2013.

USPTO. Non-final Office Action received in U.S. Appl. No. 13/748,526, dated Aug. 21, 2014.

USPTO. Final Office Action cited in corresponding U.S. Appl. No. 13/748,526, dated Dec. 13, 2013.

USPTO. Final Office Action cited in corresponding U.S. Appl. No. 13/748,526, dated Dec. 2, 2014.

USPTO. Notice of Allowance received in U.S. Appl. No. 13/748,526, dated May 28, 2015.

USPTO. Non-Final Office Action cited in corresponding U.S. Appl. No. 13/748,526, dated May 1, 2013.

USPTO. Notice of Allowance received in U.S. Appl. No. 13/748,526, dated Sep. 16, 2015.

USPTO, Notice of Allowance in U.S. Appl. No. 13/748,526, dated Jan. 5, 2016.

USPTO. Notice of Allowance received in U.S. Appl. No. 13/748,579, dated Oct. 29, 2015.

USPTO Pre-Interview First Office Action received in U.S. Appl. No. 13/748,579, dated Dec. 19, 2014.

USPTO. Final Office Action received in U.S. Appl. No. 13/748,579, dated May 19, 2015.

USPTO. Pre-Interview First Office Action received in U.S. Appl. No. 13/748,581, dated Dec. 8, 2014.

USPTO. First Action Interview Office Action received in U.S. Appl. No. 13/748,581, dated Nov. 2, 2015.

USPTO. Final Office Action received in or U.S. Appl. No. 13/748,581, dated Mar. 31, 2016.

International Search Report and Written Opinion received in related PCT Application No. PCT/US14/12581, dated Jun. 23, 2014.

USPTO. Pre-interview First Office Action received in corresponding U.S. Appl. No. 13/748,582, dated Oct. 30, 2013.

USPTO. Notice of Allowance received in U.S. Appl. No. 13/748,582, dated Sep. 23, 2015.

USPTO. Non-Final Office Action received in U.S. Appl. No. 13/748,582, dated Jul. 24, 2014.

USPTO. Notice of Allowance received in U.S. Appl. No. 13/748,582, dated Jun. 17, 2014.

USPTO. Final Office Action received in corresponding U.S. Appl. No. 13/748,582, dated Jan. 24, 2014.

USPTO. Final Office Action received in or U.S. Appl. No. 13/748,582, dated Nov. 28, 2014.

USPTO. Final Office Action received in U.S. Appl. No. 15/050,180, dated Nov. 15, 2016.

"USPTO. Non-final Office Action received in U.S. Appl. No. 13/748,581", dated Jul. 25, 2016, 14 pages.

USPTO, "Non-Final Office Action in U.S. Appl. No. 15/615,677", dated May 15, 2018, 13 Pages.

USPTO. "Non-Final Office Action in U.S. Appl. No. 15/145,353", dated Aug. 27, 2018, 11 Pages.

USPTO. "Notice of Allowance in U.S. Appl. No. 15/615,677", dated Sep. 20, 2018, 6 Pages.

* cited by examiner

LIVE INTERACTION IN PERSISTENT CONVERSATIONS

CROSS-REFERENCE TO RELATED APPLICATIONS

This application is a continuation of U.S. application Ser. No. 13/748,582 filed Jan. 23, 2013, the disclosure of which is expressly incorporated herein by reference in its entirety.

BACKGROUND

Computer and mobile device users may be increasingly communicating with each other using numerous different devices ranging from a desktop computer to a smartphone and/or tablet device, and users may often interact with more than one device type during a given day. Users may also be communicating using a variety of channels and protocols such as text messaging, instant messaging, email, social network messages and chat. In addition to asynchronous types of communication, users may also be engaging in live interaction such as one-to-one and multi-way audio and/or video conferences, and the like. Communications sent and received at one device may not be reflected in user interfaces on other devices associated with the same user.

In a persistent conversation communication stream, it may be useful to have an ability to provide live interaction (e.g., via one-to-one and/or multi-way audio and/or video conferences) and to provide a history of live interactions (e.g., date, time, participants and the like) as part of the persistent conversation.

SUMMARY

Some implementations relate generally to electronic communication, and, more particularly, to live interaction in persistent conversations.

Some implementations can include a method for live interactions in persistent conversations. The method can include receiving a communication message sent from a first user to at least one other user, wherein the communication message includes initiation of a live interaction including one or more of a one-to-one video conference, a multi-way video conference, a one-to-one audio conference and a multi-way audio conference. The method can also include generating a live interaction user interface element for display as part of a persistent conversation interface, wherein the live interaction user interface element includes an indication of live interaction invitees, status information for each invitee, an element for entering the live interaction in an audio mode and an element for entering the live interaction in a video mode.

The method can further include storing a representation of the live interaction in a conversation content section of a persistent conversation object when the live interaction ends. The method can also include updating conversation state information of the persistent conversation object to reflect the receiving of the communication message and the storing of the representation.

Some implementations can include a method for live interactions in persistent conversations. The method can include receiving a communication message sent from a first user to at least one other user, wherein the communication message includes initiation of a live interaction and generating a live interaction user interface element for display as part of a persistent conversation interface. The method can also include storing a representation of the live interaction in a conversation content section of a persistent conversation object when the live interaction ends.

Some implementations can include a system comprising one or more computers configured to perform operations. The operations can include receiving a communication message sent from a first user to at least one other user. The communication message can include initiation of a live interaction. The operations can also include generating a live interaction user interface element for display as part of a persistent conversation interface and storing a representation of the live interaction in a conversation content section of a persistent conversation object when the live interaction ends. The operations can further include updating conversation state information of the persistent conversation object to reflect the receiving of the communication message and the storing of the representation.

In either the system, method or a non-transitory computer readable medium implementation, the following features apply. The method (or operations) can further include updating conversation state information of the persistent conversation object to reflect the receiving of the communication message and the storing of the representation. The live interaction can include one or more of a one-to-one video conference, a multi-way video conference, a one-to-one audio conference and a multi-way audio conference.

The state information can include an indication of whether the live interaction was recorded. The live interaction user interface element can include an indication of live interaction invitees, status information for each invitee, and wherein the live interaction user interface element includes elements configured to permit the second user to join the live interaction in at least one of an audio conference mode and a video conference mode. The representation of the live interaction can include an indication of whether the live interaction was recorded.

The method (or operations) can also include providing for display a user interface including an avatar representing each user invited to join the live interaction and a visual indication of a participation state of each user. The method (or operations) can further include providing a rendering of the conversation content section and the conversation state information for display on each of a plurality of devices associated with a single user participating in the persistent conversation and automatically updating the rendering on the plurality of devices so as to provide the second user with a uniform view of the persistent conversation across the plurality of devices.

The live interaction user interface element can include an element configured to show a missed live interaction. The live interaction user interface element can also include an element configured to permit the second user to contact the first user. The live interaction user interface element can further include elements configured to indicate participants in the live interaction.

These and other features may provide one or more of the following advantages. The ability to view an interactive invitation to a live interaction in a persistent conversation object can permit a user to view the invitation and respond (e.g., join the live interaction, decline the live interaction or send a message to the live interaction participants). Also, the persistent conversation object can store information about current and past live interactions, which can permit users to participate in and/or recall past live interactions. Such stored information can include a list of participants, the date, time and/or duration of a live interaction, and a recording of the live interaction if one was made. The user interface can also provide a notification of a missed live interaction and provide a way for a user to contact an initiator of the live interaction from the notification.

DETAILED DESCRIPTION

Figure 1:
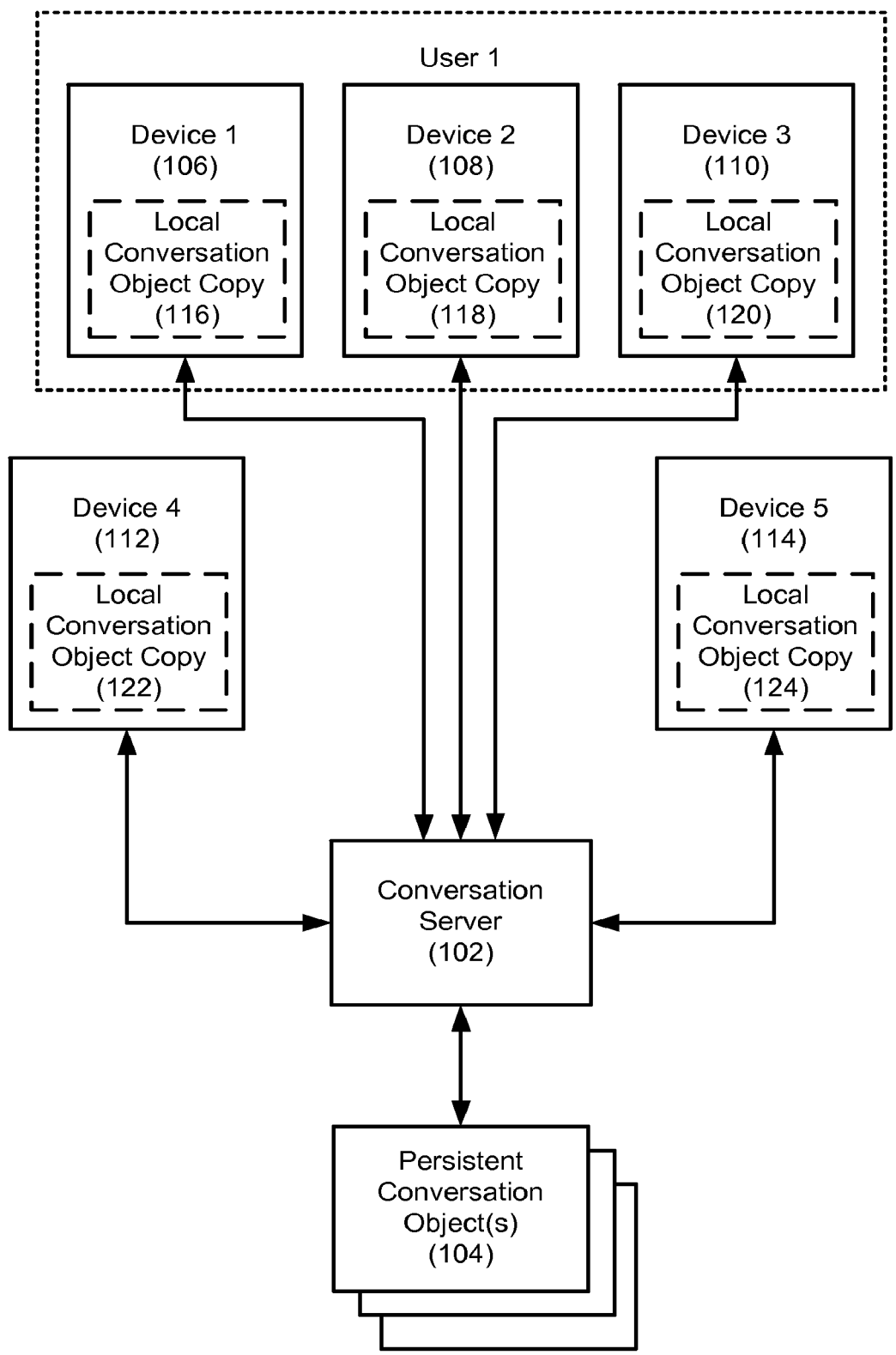
FIG. 1 is a diagram of an example persistent conversation system and user devices in accordance with some implementations.

In some implementations, a method can include providing persistent conversations between two or more users. Each persistent conversation can be stored in a central conversation storage object having conversation content and conversation state information. Some implementations can include providing a persistent conversation from a central conversation storage object and automatically updating the rendering of the conversation so that an up-to-date view of the conversation can be displayed on multiple diverse devices such as a desktop or laptop computer, a smartphone and a tablet device.

Some implementations of the method can include receiving a communication message sent from a first user to at least one other user. The communication message can be one or more of a text message, an image file, an audio file, a video file, a phone call, a fax and a one-to-one or multi-way audio/video conference. The method can also include generating a persistent conversation object having a conversation content section and conversation state information. The method can include storing the communication message in the conversation content section of the persistent conversation object and forwarding the communication message to the at least one other user. The method can further include updating the conversation state information to reflect the receiving, storing and forwarding of the communication message.

A persistent conversation device client can monitor the focus state of a user. The focus state can include an indication of focused, unfocused and typing. Persistent conversation state information can also include a level corresponding to each user indicating a point in the conversation where each user last had focus on the conversation.

Persistent conversations can have history tracking enabled or disabled. The conversation state information can include an indication of whether history tracking is enabled.

The method can include providing, for display, a user interface including at least a portion of the conversation content, an avatar representing each user participating in the conversation and a visual indication of conversation state information.

In some implementations the method can include updating the avatar appearance based on the focus state of the user corresponding to the avatar. The method can also include rendering, in a display of the conversation content, each avatar at a watermark point of the user associated with the avatar.

In addition to asynchronous messages (e.g., text messages and the like), some implementations can include live interactions in persistent conversations. The persistent conversation object can store information about the live interaction and the state information can reflect a current state of the live interaction (e.g., planned, invited, in-progress, ended, missed or the like). Also, a user interface can show current live interactions, past live interactions and live interaction invitations that were missed by a user.

While some implementations are discussed herein in relation to certain example message types such as text messaging (e.g., short message service), email, chat, social network messages, one-to-one and multi-way audio/video conferences and phone calls, it will be appreciated that persistent conversations can be applied to other known or later developed message or communication types.

As shown in FIG. 1, a persistent conversation environment can include a conversation server 102 and one or more persistent conversation objects 104. A plurality of devices (106-114) can be in communication with the conversation server 102. Each device (106-114) can have a local copy (116-124, respectively) of at least a portion of a persistent conversation object (104). Multiple devices can be associated with a single user. For example, Devices 1, 2 and 3 (106-110) are associated with User 1.

In operation, the conversation server 102 receives communication messages from one or more of the devices (106-114) and adds the communication message to a corresponding persistent conversation object (and can first create the persistent conversation object, if one does not exist yet for the conversation). The conversation server updates conversation state information for the persistent conversation object and then sends the communication message and updates, notifications of the newly received communication message and/or the updated conversation state information to the other devices associated with users participating in the corresponding conversation.

Each device can be executing a persistent conversation client that is kept in synchronization with the persistent conversation object(s) 104 stored and maintained by the conversation server 102. The central copy of the persistent conversation object can be a canonical copy of the conversation and/or contain the canonical state of the conversation. A local copy of at least a portion of a persistent conversation object can be cached at each device executing a conversation client associated with a participant in the conversation.

A conversation is initiated when a user starts a conversation with one or more other users. A persistent conversation can be given a name and participants can view members in the conversation and add members to the conversation. A conversation can be fully democratic (e.g., have no owner or moderator). Alternatively, a conversation could be moderated.

Conversations can be one-to-one or group conversations (e.g., at least three participants in a one-to-many or many-to-many arrangement). In any group conversation (e.g., three or more participants), a user can leave the conversation. Any user in any group conversation can add other users to the conversation. In some implementations, a conversation that originates as a one-on-one conversation cannot be converted to a group conversation. In a group conversation, users participating in the conversation can invite other users into the conversation by adding them to the conversation participants (e.g., by adding the new user(s) to the distribution list of users receiving a message in the conversation).

A user participating in a one-on-one conversation may not leave the conversation, but may delete the conversation (or one or more messages within the conversation). A user can delete individual messages from a conversation or the entire conversation. When a conversation (or message) is deleted, it may be removed from the user's device(s), but can remain stored in the persistent conversation object storage (e.g., 104).

A persistent conversation object can include conversation content and state information. The conversation state information can include a current focus state and notification state for each of the conversation participants. For example, the focus state can be one of focused, unfocused and typing. A focused state can be determined on a mobile device, for example, as the conversation client application being open and having visibility on the device display. On a desktop or laptop computer the focused state can be determined from the keyboard and/or mouse focus. In general, any indication that a conversation client application is visible or in use can be used to determine the focused state. The unfocused state can be determined as the opposite of the focused state (e.g., the conversation client application is not open (for mobile devices) or does not have keyboard or mouse focus (for desktop and laptop computers). The typing state can be determined based on the focused state coupled with an indication that the user is entering text (or otherwise entering data for the conversation such as audio, video or the like). Focus states are discussed below regarding FIGS. 3 and 7.

In addition to focus state, the conversation state information can include a watermark or level in the conversation at which each user was last focused on the conversation. This can be used to indicate or suggest a point at which each participant stopped reading the conversation. The watermark can also be used to indicate a read or unread state of the conversation. For example, if the watermark is at the lowest point in the conversation (e.g., at the most recent content addition) then the conversation can be considered to be read by the user. However, if the watermark for a user is not at the lowest point in the conversation then the conversation could be considered to be at least partially unread by that user. Watermarks for a one-on-one conversation are described below regarding FIG. 4 and FIG. 7.

The conversation state information can also include an indication of whether history tracking is enable or disabled. When history tracking is enabled, the conversation content is permanently stored in the persistent conversation object. When the history tracking is disabled (e.g., one or more users wants the conversation "off the record") the conversation will only be stored in the persistent conversation object for a finite time and then deleted. The user interface can be modified to show history tracking disabled (as discussed below regarding FIG. 6). The history enabled/disabled can be a global setting that affects all participants in the conversation.

The conversation state information can also include the name of the conversation and a list of the participants. Focus state, notification state, watermark and history tracking state information indications are applicable to both one-on-one and group conversations.

Figure 2:
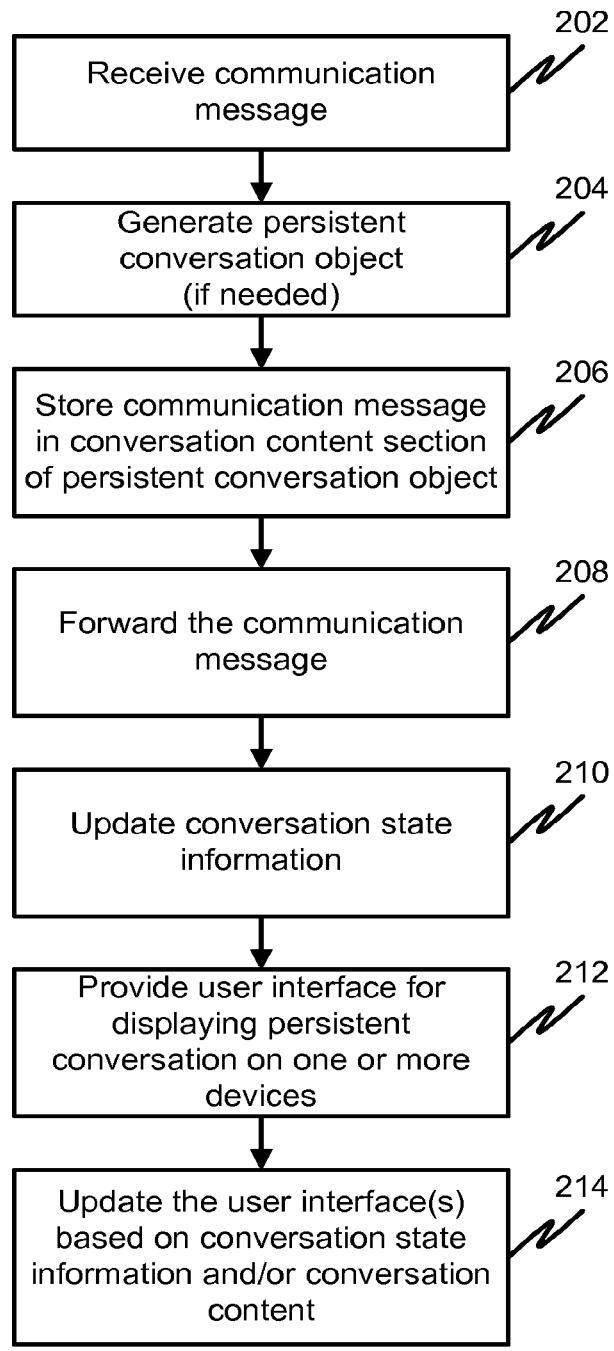
FIG. 2 is a flow chart of an example method for providing persistent conversations in accordance with some implementations.

FIG. 2 is a flow chart of an example method 200 for providing persistent conversations in accordance with some implementations. Processing begins at 202, where a communication message from one user to one or more other users is received. For example, the communication message can be received at a conversation server 102. The communication message can include one or more protocols or types, such as those mentioned above. Processing continues to 204.

At 204, a persistent conversation object is generated (or created) if one does not already exist for the conversation. Generating a persistent conversation object can include adding the communication message (or information representing or linking to the message) to the conversation content section of the conversation object. Generating can also include initializing the conversation state information to reflect the new conversation and the arrival of the communication message. The initial conversation participants can be extracted from the list of intended recipients of the communication message. The conversation can be given a default name. If a persistent conversation object already exists for the conversation, then the existing conversation object can be used. Processing continues to 206.

At 206, the communication message is stored in the conversation content section of the persistent conversation object. Processing continues to 208.

At 208, the communication message is forwarded to the other conversation participants. For example, the conversation server 102 could forward a message from Device 1 106 to the other devices (108-114). The forwarding could be accomplished by synchronizing the local copy of the conversation on each device with the canonical conversation object (e.g., 104). A conversation client on each device could be used to synchronize and update the local conversation object copy (e.g., 116-124). Processing continues to 210.

At 210 the conversation state information is updated to reflect the new communication message and the focus and notification states of the users. Processing continues to 212.

At 212, a user interface for displaying the persistent conversation on each device associated with a participant in the conversation is provided. For example, the user interface could be part of (or coupled to) the conversation client on each device (106-114). Processing continues to 214.

At 214, the user interfaces are updated base on the conversation state information and the conversation content. For example, the user interface could be updated based on synchronizing the content and state information for the conversation so that the user interface on each device shows the new communication message and also reflects real time (or near real time) conversation state information. It will be appreciated that 202-214 can be repeated in whole or in part in order to accomplish a contemplated persistent conversation task.

Figure 3:
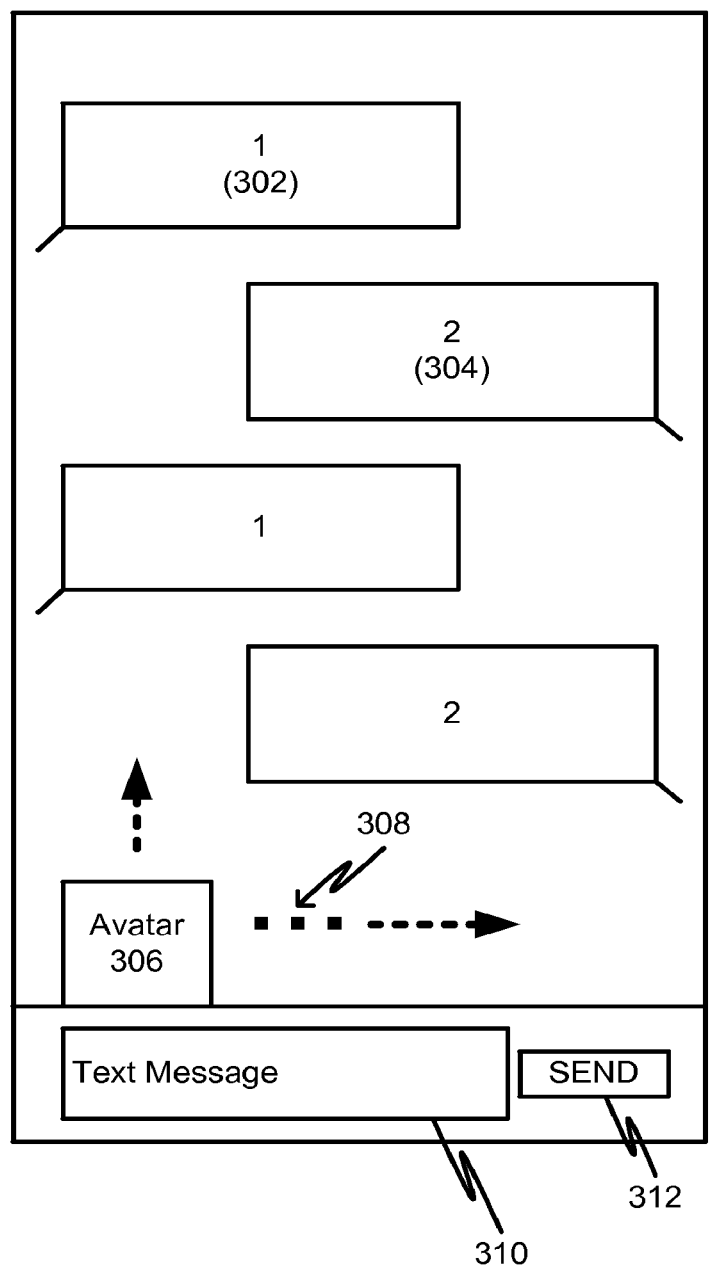
FIG. 3 is a diagram of an example persistent conversation graphical user interface in accordance with some implementations.

FIG. 3 is a diagram of an example persistent conversation graphical user interface 300 in accordance with some implementations. The user interface 300 includes communication messages from a first user (302) and a second user (304). A conversation participant can be represented by an avatar 306. When a user is in a focused or typing state, the avatar 306 can animate and rise in an upward direction as shown by the dashed arrow pointing toward the top of the figure. Also, when the user associated with the avatar 306 is typing, an indication can be made (308) that the user is typing. The indication can include animated dots as shown by the dashed arrow pointing to the right of 306 in FIG. 3.

The user interface 300 can also include a text entry element 310 and a send button 312 for sending the message typed in the text entry element 310.

Figure 4:
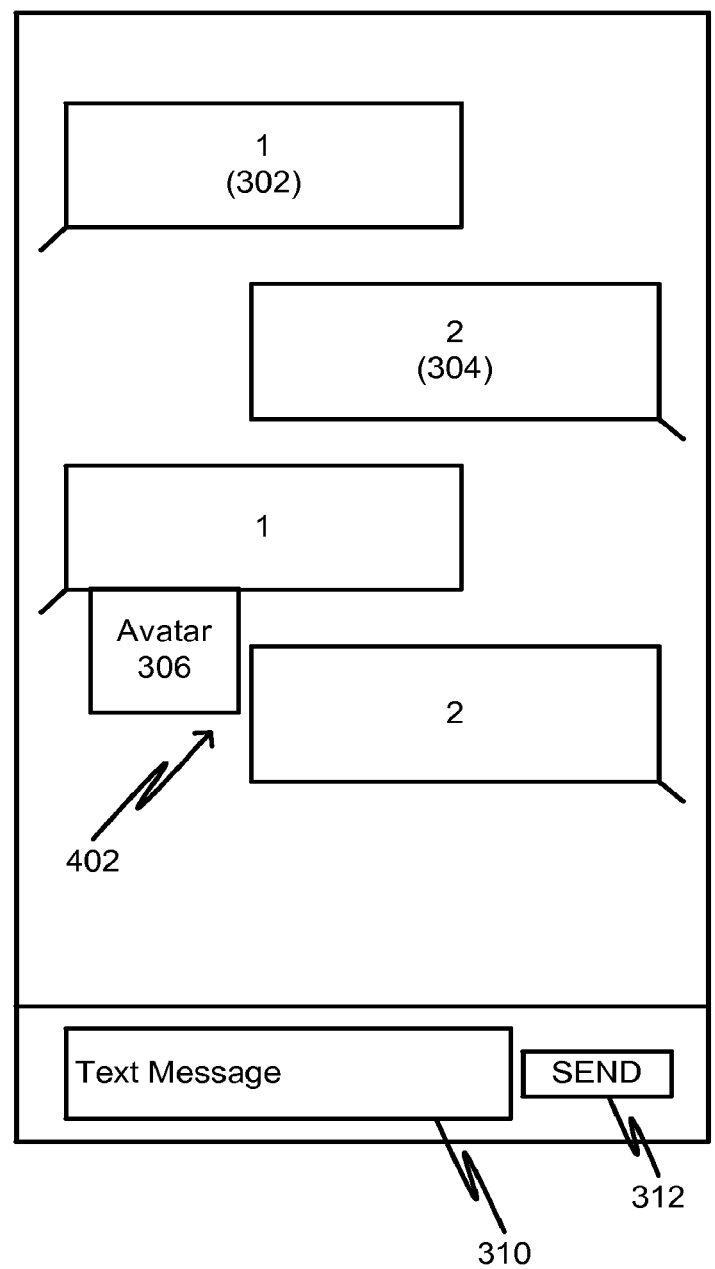
FIG. 4 is a diagram of an example persistent conversation graphical user interface in accordance with some implementations.

FIG. 4 is a diagram of an example persistent conversation graphical user interface in accordance with some implementations. In addition to the elements identified above in connection with FIG. 3, there is shown in FIG. 4 an example of a watermark in which the avatar 306 is placed at a location 402 indicating the watermark for the user associated with the avatar 306.

Figure 5:
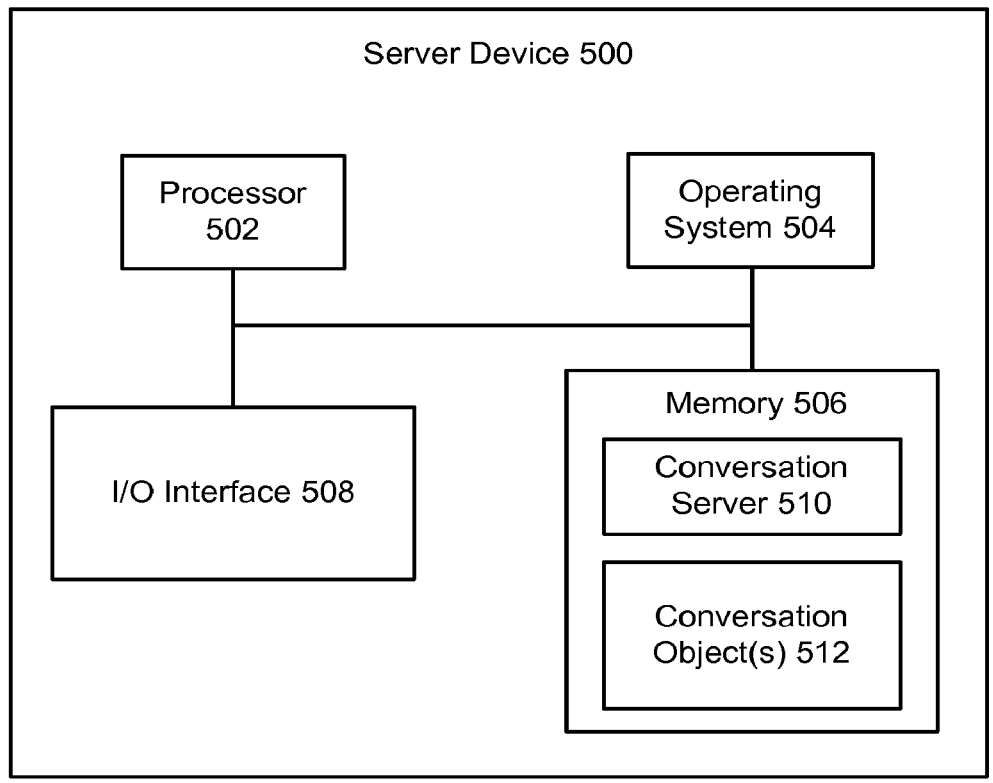
FIG. 5 is a diagram of an example server system in accordance with some implementations.

FIG. 5 is a diagram of an example server device 500 that can be used to create, manage, distribute and cause to be displayed persistent conversations in accordance with some implementations. The server device 500 includes a processor 502, operating system 504, memory 506 and I/O interface 508. The memory 506 can include a persistent conversation server 510 and one or more persistent conversation objects 512.

In operation, the processor 502 may execute the conversation server application 510 stored in the memory 506. The conversation server 510 can include software instructions that, when executed by the processor, cause the processor to perform operations for creating, managing, distributing and causing to be displayed persistent conversations in accordance with the present disclosure (e.g., the conversation server 510 can perform one or more of steps 202-214 described above and, in conjunction, can access the conversation object(s) 512). The conversation server 510 can also operate in conjunction with the operating system 504.

Persistent conversation can be used among members (or users) of a social network. For example, the messages sent between a first social network member and one or more other members in the social graph of the first social network member (or to users outside of the social network) can be exchanged via a persistent conversation as described above.

Figure 6:
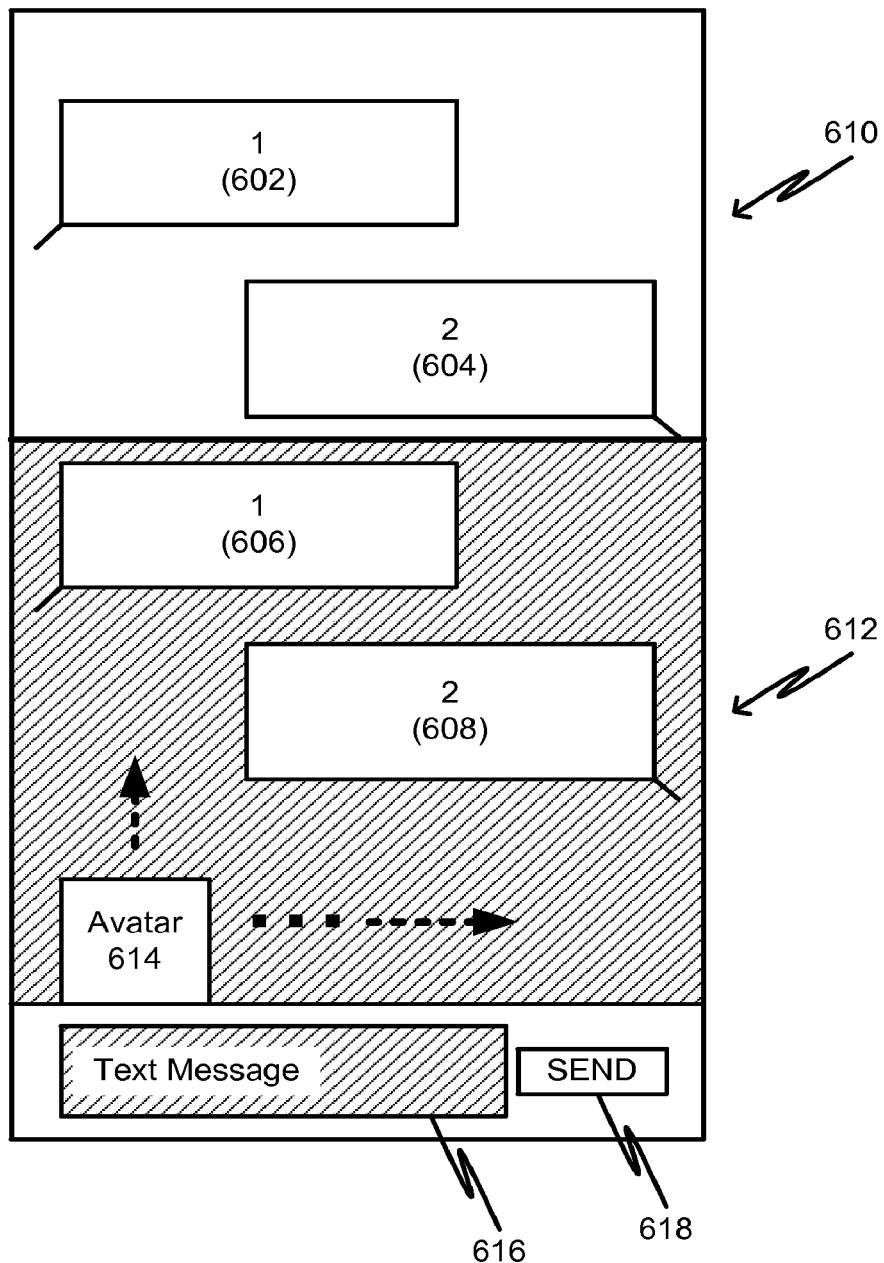
FIG. 6 is a diagram of an example persistent conversation graphical user interface in accordance with some implementations.

FIG. 6 is a diagram of an example persistent conversation graphical user interface 600 in accordance with some implementations. In particular, the user interface 600 includes messages from a first user (602) and a second user (604) in a section of the conversation in which history tracking was enabled 610. There are also messages from the first user (606) and the second user (608) in a section of the conversation in which the history has been disabled 612.

The user interface 600 includes an avatar as described above and a text message area 616 and a send button 618.

When history is disabled (e.g., the conversation is "off the record") the conversation rendering is changed for the section of the conversation which does not have history enabled (e.g., 612). Also, the compose experience can be changed (e.g., the background change in the text box 616) to indicate history is disabled.

Figure 7:
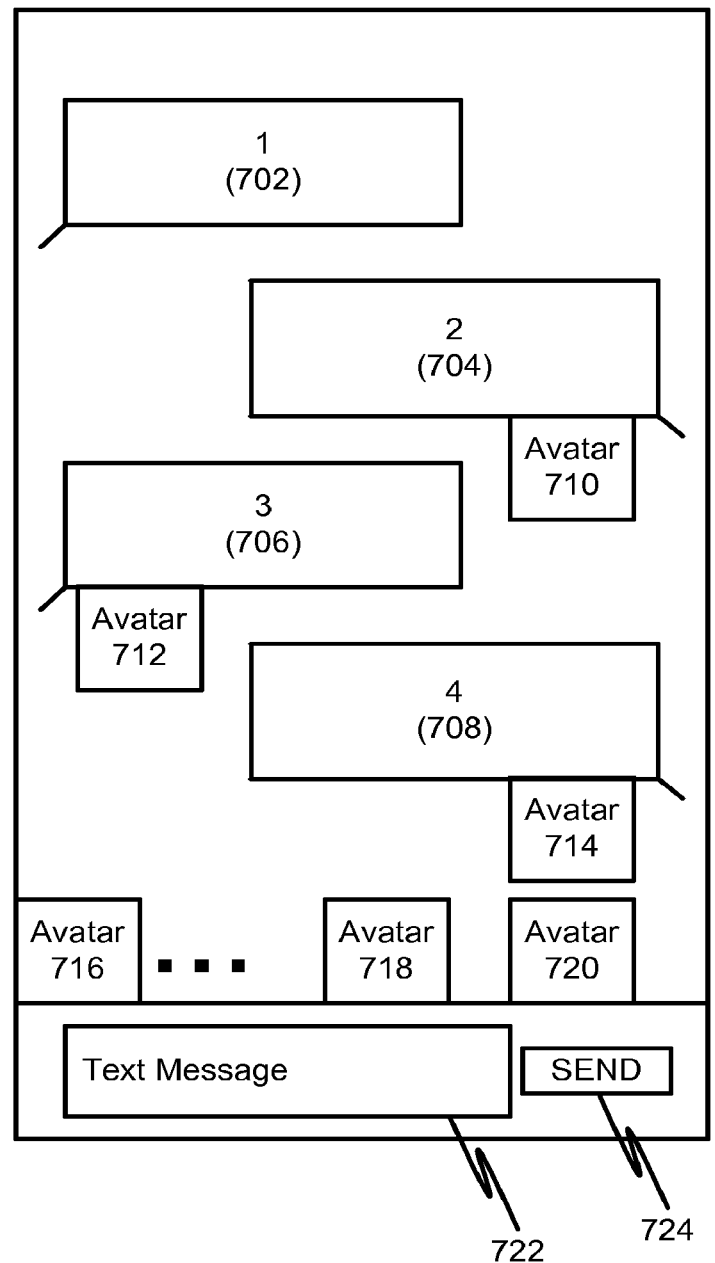
FIG. 7 is a diagram of an example persistent conversation graphical user interface in accordance with some implementations.

FIG. 7 is a diagram of an example persistent conversation graphical user interface 700 in accordance with some implementations. In particular, the user interface 700 shows a group conversation with multiple watermarks and avatars. Messages (702-708) can come from four different respective users. Each avatar (710-720) can be used to represent the watermark and/or state for each user corresponding to that avatar.

For example, the user associated with avatar 710 has a watermark at message 2 (704). The user associated with avatar 712 has a watermark at message 3 (706). The user associated with avatar 714 has a watermark at message 4 (708).

Users associated with avatars 716-720 are giving the conversation (or conversation client application) focus. The user corresponding to avatar 716 is typing.

The user interface 700 also includes a text entry element 722 and a send button 724.

The server (e.g., 500) can include, but is not limited to, a single processor system, a multi-processor system (co-located or distributed), a cloud computing system, or a combination of the above.

Figure 8:
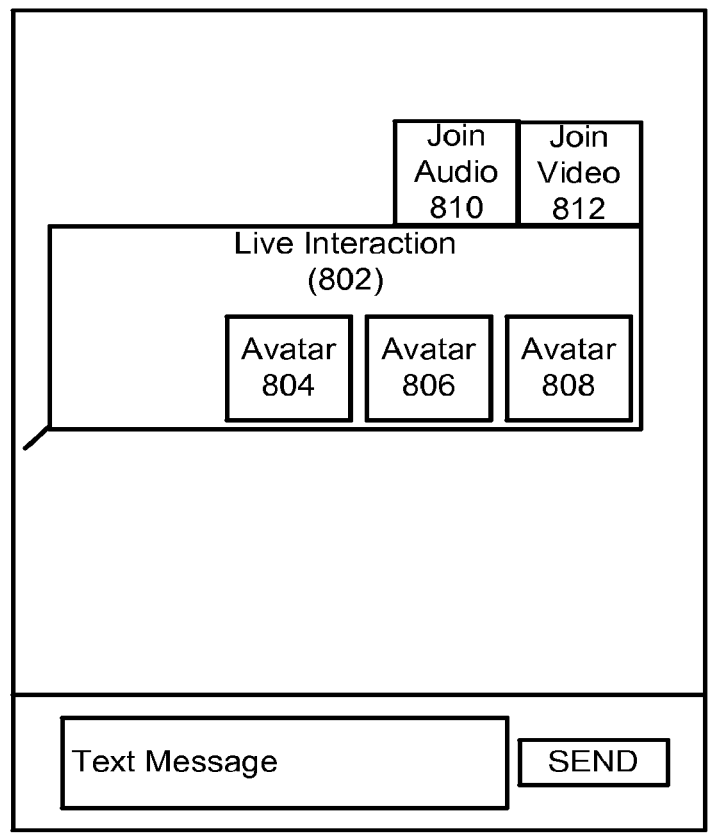
FIGS. 8-10 are diagrams of an example user interfaces showing live interactions in persistent conversations in accordance with some implementations.
Figure 9:
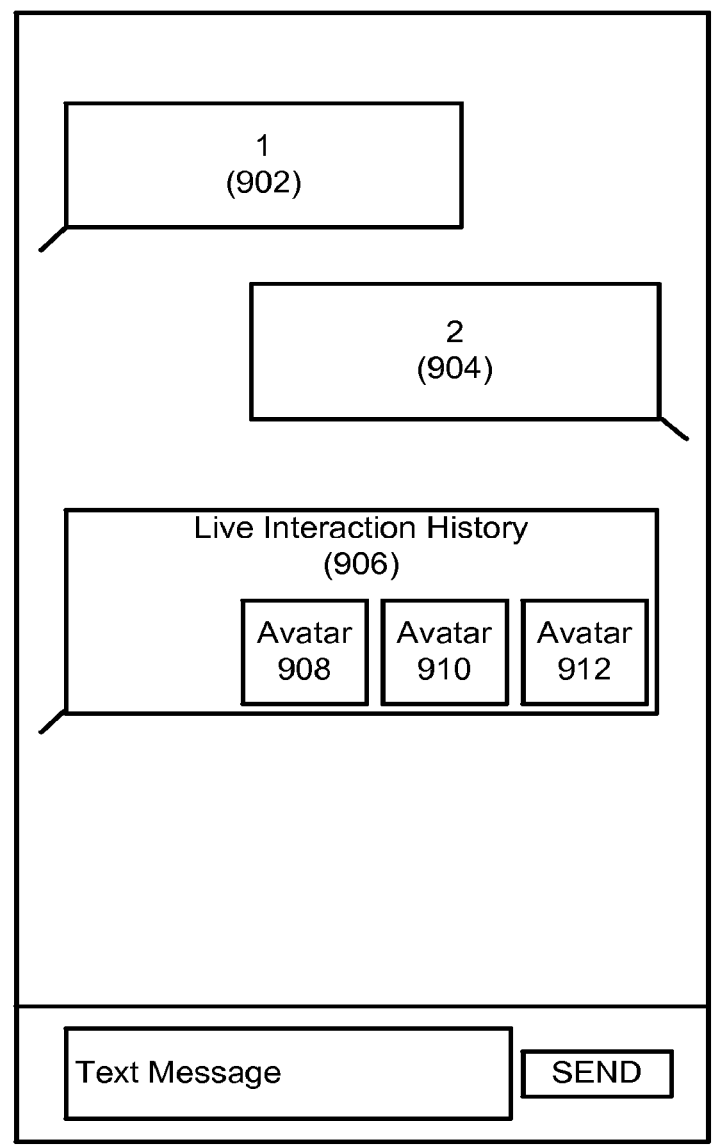
Figure 10:
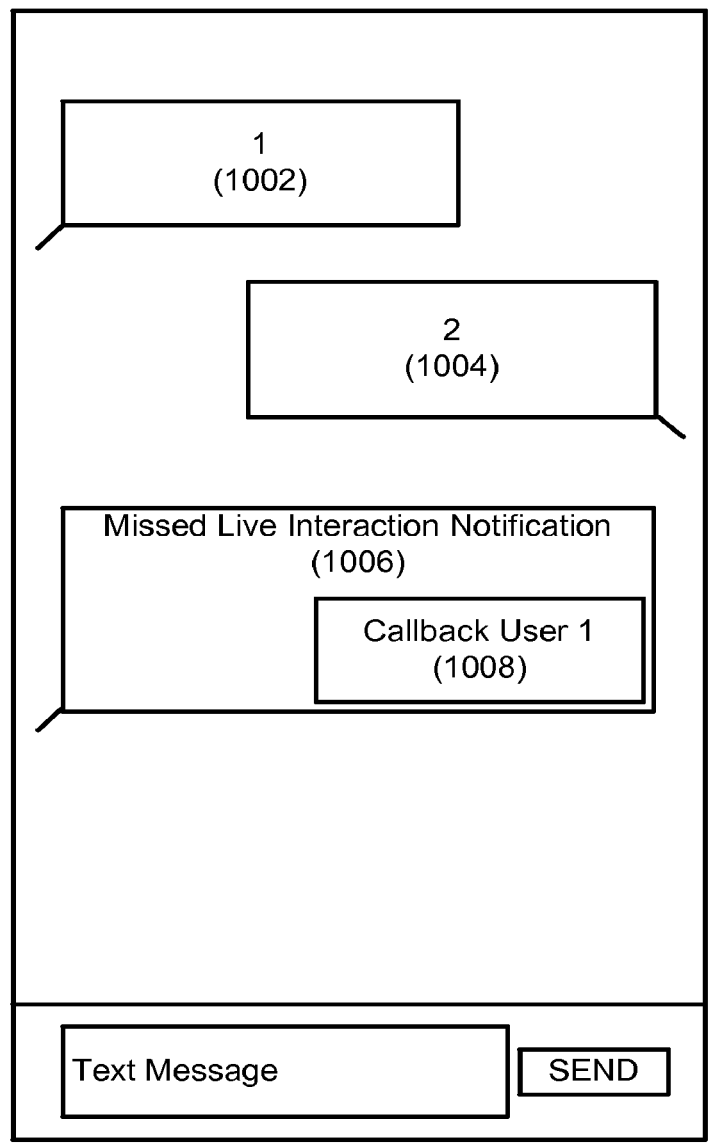

FIGS. 8-10 are diagrams of an example user interfaces showing live interactions in persistent conversations. FIG. 8 shows an example user interface 800 for displaying persistent conversations in which a live interaction user interface element 802 is shown. The live interaction user interface element 802 includes avatars (804-808) representing the participants in the live interaction. Also, the live interaction user interface element 802 includes an element for joining the live interaction in an audio conference mode 810 and in a video conference mode 812.

In operation, a user device can display a persistent conversation user interface 800 and, when an indication of a live interaction is received, the user interface can display the live interaction user interface element 802. The user can view the participants in the live interaction via the avatars (804-808). If the user wishes to join the live interaction, the user can join in an audio mode by selecting the join audio user interface element 810 or can join in a video mode by selecting the join video user interface element 812. It will be appreciated that the video mode can include both video and audio.

The live interaction user interface element 802 can also include a recording user interface element (not shown) configured to permit a participant to record the live interaction. The recording (or a reference to the recording) of the live interaction can be stored in the content section of the persistent conversation object. Also, the live interaction user interface element 802 can include an element configured to permit a user to decline to participate in the live interaction and to optionally provide a message accompanying the decline (e.g., "I'm in a meeting", "I'm on another call" or the like).

Once a live interaction has completed, a piece of history information about the live interaction can be stored as part of the persistent conversation. For example, FIG. 9 shows an example persistent conversation user interface 900 in which messages between a first user (902) and a second user (904) are shown. The persistent conversation also includes an indication of a live interaction 906. The live interaction history information 906 can include information such as participants in the live interaction (represented by avatars 908-912), date, time and duration of the live interaction (not shown), and a link (not shown) to a recording of the live interaction if one was made.

In addition to current and past live interactions, a persistent conversation user interface can show a missed live interaction (or live interaction invitation). For example, FIG. 10 shows an example user interface 1000 having messages between a first user 1002 and a second user 1004. The interface 1000 also shows a missed live interaction notification 1006.

The missed live interaction notification 1006 can be displayed when a user was not present to respond to a live interaction invite or event. The missed live interaction notification 1006 can include a user interface element 1008 that can permit the user to callback (or otherwise contact via any of the communications methods mentioned above) an initiator of the live interaction. The missed live interaction notification 1006 can also include an indication of the initiator and/or participants in the live interaction.

The client (or user, member or conversation participant) device can include, but is not limited to, a desktop computer, a laptop computer, a portable computer, a tablet computing device, a smartphone, a feature phone, a personal digital assistant, a media player, an electronic book reader, an entertainment (or computing) system of a vehicle or the like. Other examples of devices include computing and/or display systems built into windows, walls, furniture, glasses, goggles, wrist watches, clothing or the like. In general, any computing device capable of implementing one or more of the methods described herein can be used.

The network connecting user devices to a conversation server can be a wired or wireless network, and can include, but is not limited to, a WiFi network, a local area network, a wide area network, the Internet, or a combination of the above.

The data storage, memory and/or computer readable medium can be a magnetic storage device (hard disk drive or the like), optical storage device (CD, DVD or the like), electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or non-transitory computer readable media having stored instructions for performing one or more live interaction in persistent conversation tasks as described herein). The stored software instructions can be executed on a programmed general purpose computer, a special purpose computer, a microprocessor, or the like.

It is, therefore, apparent that there is provided, in accordance with the various example implementations disclosed herein, systems, methods and computer readable media for live interactions in persistent conversations.

While the disclosed subject matter has been described in conjunction with a number of implementations, it is evident that many alternatives, modifications and variations would be or are apparent to those of ordinary skill in the applicable arts. Accordingly, Applicants intend to embrace all such alternatives, modifications, equivalents and variations that are within the spirit and scope of the disclosed subject matter.

What is claimed is:

1. A computer-implemented method comprising:
receiving, at a processor, a communication message sent by a first user via a first user device, wherein the communication message has an intended recipient that includes at least one other user different than the first user, and wherein the communication message includes information effective to initiate a live interaction between the first user device and at least one other device corresponding to the at least one other user via the processor;
storing the communication message in a persistent conversation object stored in a server;
after the storing, forwarding a portion of the persistent conversation object that contains the communication message from the server to the at least one other device;
upon conclusion of the live interaction, updating conversation state information of the persistent conversation object stored in the server to include history information corresponding to the live interaction; and
determining that one or more of the users had previously disabled history tracking for the concluded, live interaction, then waiting for a predetermined amount of time after the conclusion of the live interaction to elapse, then deleting the communication message from the persistent conversation object that is stored on the server after the predetermined period of time after the conclusion of the live interaction has elapsed.

2. The method of claim 1, further comprising providing a portion of the conversation state information that was updated in the persistent conversation object from the server to the first user device and the at least one other device.

3. The method of claim 1, wherein initiation of the live interaction includes initiation of one or more of a one-to-one video conference, a multi-way video conference, a one-to-one audio conference, and a multi-way audio conference.

4. The method of claim 1, wherein updating the conversation state information to include the history information includes storing identifiers of participants in the live interaction.

5. The method of claim 1, wherein updating the conversation state information to include the history information includes storing one or more of a date of the live interaction, a time of the live interaction, and a duration of the live interaction.

6. The method of claim 1, wherein updating the conversation state information to include the history information includes:
determining a recording of the live interaction was made; and
upon determination that the recording was made, storing a link to the recording.

7. The method of claim 1, further comprising generating a live interaction user interface for display as part of a persistent conversation interface, wherein the live interaction user interface includes a first element that, upon selection, causes a recording of the live interaction to be made.

8. The method of claim 7, wherein the live interaction user interface includes a second element that, upon selection, is effective to indicate declined participation the live interaction.

9. The method of claim 7, wherein the live interaction user interface includes a third element that, upon selection, initiates a callback to the first user.

10. A system comprising:
one or more computers configured to perform operations including:
receiving, at a processor, a communication message sent by a first user via a first user device, wherein the communication message has an intended recipient that includes at least one other user different than the first user, and wherein the communication message includes information effective to initiate a live interaction between the first user device and at least one other device corresponding to the at least one other user via the processor;
storing the communication message in a persistent conversation object stored in a server;
after the storing, forwarding a portion of the persistent conversation object that contains the communication message from the server to the at least one other device;
upon conclusion of the live interaction, updating conversation state information of the persistent conversation object stored in the server to include history information corresponding to the live interaction; and
determining that one or more of the users had previously disabled history tracking for the concluded, live interaction, then waiting for a predetermined amount of time after the conclusion of the live interaction to elapse, then deleting the communication message from the persistent conversation object that is stored on the server after the predetermined period of time after the conclusion of the live interaction has elapsed.

11. The system of claim 10, further comprising providing a portion of the conversation state information that was updated in the persistent conversation object stored in the server to the first user device and the at least one other device.

12. The system of claim 10, wherein the history information includes a list of participants in the live interaction.

13. The system of claim 10, wherein the history information includes one or more of a date of the live interaction, a time of the live interaction, and a duration of the live interaction.

14. The system of claim 10, wherein updating the conversation state information to include the history information includes:
   determining a recording of the live interaction was made; and
   upon determination that the recording was made, storing a link to the recording.

15. The system of claim 10, further comprising generating a live interaction user interface for display as part of a persistent conversation interface, the live interaction user interface including one or more of a first element, that when selected, causes a recording of the live interaction to be made, a second element that, upon selection, is effective to indicate declined participation the live interaction, and a third element that, upon selection, initiates a callback to the first user.

16. A nontransitory computer readable medium having stored thereon software instructions that, when executed by a computer, cause the computer to perform operations comprising:
   receiving, at a processor, a communication message sent by a first user via a first user device, wherein the communication message has an intended recipient that includes at least one other user different than the first user, and wherein the communication message includes information effective to initiate a live interaction between the first user device and at least one other device corresponding to the at least one other user via the processor;
   storing the communication message in a persistent conversation object stored in a server;
   after the storing, forwarding a portion of the persistent conversation object that contains the communication message from the server to the at least one other device;
   upon conclusion of the live interaction, updating conversation state information of the persistent conversation object stored in the server to include history information corresponding to the live interaction; and
   determining that one or more of the users had previously disabled history tracking for the concluded, live interaction, then waiting for a predetermined amount of time after the conclusion of the live interaction to elapse, then deleting the communication message from the persistent conversation object that is stored on the server after the predetermined period of time after the conclusion of the live interaction has elapsed.

17. The nontransitory computer readable medium of claim 16, further comprising providing a portion of the conversation state information that was updated in the persistent conversation object stored in the server the first user device and to the at least one other device.

18. The nontransitory computer readable medium of claim 16, wherein the history information includes participants in the live interaction, a date of the live interaction, a time of the live interaction and a duration of the live interaction.

19. The nontransitory computer readable medium of claim 16, wherein updating the conversation state information to include the history information includes:
   determining a recording of the live interaction was made; and
   upon determination that the recording was made, storing a link to the recording.

20. The nontransitory computer readable medium of claim 16, wherein the live interaction user interface includes one or more of a first element, that, upon selection, causes a recording of the live interaction to be made, a second element that, upon selection, is effective to indicate declined participation the live interaction, and a third element that, upon selection, initiates a callback to the first user.

* * * * *